United States Patent [19]

Lishevskaya et al.

[11] 4,198,326

[45] Apr. 15, 1980

[54] METHOD FOR PREPARING MODIFIED GRAFT COPOLYMERS OF CELLULOSE WITH MONOVINYL MONOMERS IN THE PRESENCE OF A DIVINYLBENZENE MODIFIER

[76] Inventors: Marina O. Lishevskaya, ulitsa Novatorov, 40, korpus 11, kv. 46; Boris P. Morin, ulitsa Novatorov, 40, korpus 19, kv. 13; Galina I. Stanchenko, ulitsa Krasnaya Presnya, 9, kv. 117; Tatyana A. Vanjushkina, Krivokolenny pereulok, 10, kv. 10; Zakhar A. Rogovin, Donskaya ulitsa, 24, kv. 68, all of Moscow, U.S.S.R.

[21] Appl. No.: 953,341

[22] Filed: Oct. 23, 1978

[30] Foreign Application Priority Data

Feb. 14, 1978 [SU] U.S.S.R. .............................. 258170[I]

[51] Int. Cl.$^2$ .................................................. C08L 1/02
[52] U.S. Cl. ............................... 260/17.4 GC; 210/24; 521/25
[58] Field of Search ................................ 260/17.4 GC

[56] References Cited

U.S. PATENT DOCUMENTS 3,889,678   6/1975   Chatterjee et al. ........... 260/17.4 GC
4,076,663   2/1978   Masuda et al. ............... 260/17.4 GC

*Primary Examiner*—Edward M. Woodberry
*Attorney, Agent, or Firm*—Lackenbach, Lilling & Siegel

[57] ABSTRACT

A method for preparing modified graft copolymers of cellulose with monovinyl monomers containing ionic groups or non-ionic groups capable of being converted to ionic ones involving a free-radical polymerization of said monovinyl monomers onto cellulose in the presence of a free-radical type initiator and modification of the resulting graft-copolymers of cellulose with said monovinyl monomers. The processes are performed in one stage in the presence of a modifying agent, that is, divinylbenzene taken in an amount ranging from 1 to 5 mol. % of the monovinyl monomer. The static exchange capacity of the modified graft copolymers of cellulose in the form of cationites is as high as 5 mg-equiv/g. The static exchange capacity of the graft copolymers of cellulose in the form of anionites is as high as 3.5 mg-equiv/g. The degree of swelling in water at a temperature of 20° C. is within the range of from 180 to 200%. The modified graft copolymers of cellulose have a fibrous structure. They are not brittle and are capable of being processed into fabrics, non-woven materials and other textile products (wastes in the textile processing amount to 6–8% by mass of the starting fibres).

7 Claims, No Drawings

METHOD FOR PREPARING MODIFIED GRAFT COPOLYMERS OF CELLULOSE WITH MONOVINYL MONOMERS IN THE PRESENCE OF A DIVINYLBENZENE MODIFIER

FIELD OF THE INVENTION

The present invention relates to methods for preparing ion exchange cellulose fibrous materials and, more specifically, to methods for preparing modified graft copolymers of cellulose with monovinyl monomers containing ionic groups or non-ionic groups capable of being converted to ionic ones. Said graft copolymers containing ionic groups are useful in processes of ion exchange, for example for collection of ions of precious and other metals, purification of waste waters, sugar syrups, as filtering layers in respirators for individual protection of respiratory organs, etc. After a polymer-analogous conversion of non-ionic groups to ionic ones, graft copolymers of cellulose are used for the above mentioned applications.

Ion exchange cellulose materials have recently acquired an ever-growing importance. They are widely used in different industries. Cellulose ionites have certain essential advantages over ion exchange resins. A highly-developed active surface of fibrous ionites makes it possible to perform processes of ion exchange at higher speeds compared to the use of ion exchange resins. The fibrous structure of cellulose ionites enables their use in various forms such as fibers, powders, fabrics and non-woven materials. This makes it possible to substantially enlarge the range of alternatives of process equipment employed in ion-exchange processes and make use of fibrous ionites in such applications where the use of ion exchange granulated resins is impossible. In particular, ion-exchange non-woven materials are useful, as it has been mentioned hereinabove, as a filtering aid in respirators for protection of respiratory organs.

BACKGROUND OF THE INVENTION

Known in the art are methods for preparing graft copolymers of cellulose with monovinyl monomers containing ionic groups or non-ionic groups capable of being converted to ionic ones by way of a free-radical graft polymerization, on cellulose, of said vinyl monomers in the presence of a free-radical type initiator.

However, during graft-polymerization, onto cellulose, of monovinyl monomers such as acrylic acid or methacrylic acid, or in a polymer-analogous conversion of said non-ionic groups to ionic ones there occurs a considerable swelling of the resulting copolymers. This phenomenon does not make it possible to obtain the desired product which would be uniform in its composition. It also results in impaired working properties during the ion exchange process (i.e. hinders multiple use of fibrous ionites in processes of sorption and desorption), the formation of adhesive bonds between fibers, increased brittleness of fibers thus precluding the possibility of textile processing the fibers to woven fabrics, non-woven materials and other textile goods.

Also known in the art is a method for preparing graft copolymers of cellulose with vinyl monomers containing non-ionic groups capable of being converted to cation exchange groups by way of a radical graft polymerization, onto cellulose, of said monovinyl monomers in the presence of free-radical type initiators, followed by the treatment (for the purpose of converting non-ionic groups to ionic ones) of the resulting graft-copolymers with a 2.5–10 M solution of an alkali at a temperature within the range of from 100° to 130° C. for a period of from 10 to 30 minutes and washing said copolymers with alcohols to remove the excessive alkali.

Said process makes it possible to avoid an excessive swelling of graft copolymers of cellulose during a polymer-analogous conversion of non-ionic groups to ionic ones and during an ion exchange process, as well as to obtain the desired products with a uniform composition and a high sorption power. However, the products prepared by this method comprise segregated clots formed by short fibers adhering to each other. Such products are not suitable for further textile processing.

Also known in the art is a method for preparing modified graft copolymers of cellulose with monovinyl monomers containing ionic groups. The method comprises treatment of cellulose with a modifying (cross-linking) agent such as dimethylolethyleneurea or formaldehyde in the presence of an acidic catalyst, followed by xanthation of the modified cellulose and a radical graft polymerization, onto the modified cellulose, of monovinyl monomers containing ionic groups in the presence of free-radical type initiators.

This method, however, is a multi-staged one and gives rather brittle products. The modification (cross-linking) by means of, for example, dimethylolethyleneurea or formaldehyde results in the formation of short bridges between macromolecules of cellulose and, consequently, in impaired relaxation properties of the polymer. Furthermore, brittleness of the resulting graft copolymers is due to a lowered molecular mass of cellulose associated with acidic hydrolysis thereof occurring under the effect of said acidic catalyst. An increased brittleness of the fibrous materials prepared by this prior art method makes these materials unsuitable for further textile processing to woven fabrics, non-woven materials and other textile products.

It is an object of the present invention to overcome the above-mentioned disadvantages inherent in the prior art methods.

The present invention is directed to the provision, in a method of preparing modified graft copolymers of cellulose with monovinyl monomers containing ionic groups or non-ionic groups capable of being converted to ionic ones, of a modifying agent and conditions of radical graft polymerization and modification which make it possible to simplify the process technology and equipment and obtain the desired products with a high exchange capacity, an optimal degree of swelling and capability of being processed in textile fabrics, non-woven materials and other textile products.

SUMMARY OF THE INVENTION

It is an object of the present invention to provide a technologically simple method for preparing modified graft copolymers of cellulose with monovinyl monomers containing ionic groups or non-ionic groups capable of being converted to ionic ones.

It is another object of the present invention to provide such a method which would make it possible to obtain the desired products possessing a high exchange capacity.

It is still another object of the present invention to provide such a method which would make it possible to obtain graft copolymers of cellulose with monovinyl monomers with an optimal degree of swelling.

It is a further object of the present invention to provide such a method which would make it possible to obtain fibrous materials capable of textile processing to fabrics, non-woven materials and other textile products.

These and other objects are accomplished by a method for preparing modified graft copolymers of cellulose with monovinyl monomers containing ionic groups or non-ionic groups capable of being converted to ionic ones which method comprises a free-radical graft polymerization, onto cellulose, of said monovinyl monomers in the presence of a free-radical type initiator and a modifier. In accordance with the present invention, the free-radical polymerization and modification are performed in a single stage in the presence of a modifying agent, i.e., divinylbenzene in an amount ranging from 1 to 5mol. % of the monovinyl monomer amount. In so doing, subjected to modification are graft copolymers of cellulose with monovinyl monomers formed during the process of free-radical graft polymerization.

The method according to the present invention is simple, as to the process technology and equipment, and performed in one stage. It makes it possible to obtain the desired products with a high exchange capacity. Thus, the static exchange capacity of graft copolymers of cellulose with monovinyl monomers modified with divinylbenzene in the form of cationites is as high as 5 mg-equiv/g, while the static exchange capacity of said copolymers of cellulose in the form of anionites is equal to 3.5 mg-equiv/g.

Furthermore, the method according to the present invention makes it possible to obtain the desired products with an optimal degree of swelling which is of a great importance for an efficient ion exchange process. Thus, for graft copolymers of cellulose with monovinyl monomers modified with divinylbenzene in the form of cationites the degree of swelling in water at a temperature of 20° C. is within the range of from 170 to 200%, while in the form of anionites it is equal to 180–200%.

The modified graft-copolymers of cellulose prepared by the method according to the present invention have a fibrous structure. They are non-brittle, capable of being processed into tissues, non-woven materials and other textile products (wastes in the textile processing constitute, as a rule, 6–8% by mass of the starting fibres). These properties are ensured owing to the fact that modification (cross-linking) is effected by way of the formation of bridges between the graft-chains, not between macromolecules of cellulose as it occurs in the prior art method. The fiber structure resulting from such modification is characterized by high relaxation properties.

DETAILED DESCRIPTION OF THE INVENTION

In the method according to the present invention cellulose may be used in the form of viscose staple, cotton, or pulp recovered from wood.

As vinyl monomers use may be made of, for example, acrylic and methacrylic acids, derivatives thereof, monovinylpyridines and the like.

As free-radical type initiators use may be made, for example of the system $H_2O_2$—$Fe^{2+}$, the system cellulose

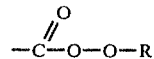

wherein R is hydrogen or an alkyl; the system:

wherein X is $H_2O_2$, $(NH_4)_2S_2O_8$, $Fe^{3+}$, $V^{5+}$, $Cr^{6+}$.

The method according to the present invention may be effected both continuously and discontinuously.

When the method according to the present invention is effected discontinuously, cellulose in the form of viscose staple, cotton or pulp recovered from wood is charged, for example, into an apparatus for dyeing fibers under pressure. Then into the apparatus there is poured an aqueous solution, aqueous emulsion or an aqueous dispersion of a mixture of a monvinyl monomer containing ionic groups or non-ionic groups capable of being converted to ionic ones, and a modifying agent, that is, divinylbenzene. The amount of divinylbenzene is varied within the range of from 1 to 5 mol. % of the monovinyl monomer. Free-radical graft polymerization and modification are performed in a single stage in the presence of a free-radical type initiator at a temperature within the range of from 20° to 80° C. for a period of from 30 to 90 minutes. On completion of the process, the spent reaction mixture is drained, the resulting product is washed with water and dried.

In the case where in the graft polymerization use is made of a monovinyl monomer containing non-ionic groups capable of being converted to ionic ones, the product resulting from the graft polymerization is subjected to treatment for the purpose of a polymer-analogous conversion of non-ionic groups to ionic ones. Said treatment is effected with the use of conventional techniques such as treatment with an aqueous solution of an alkali or ammonium sulphide and the like.

In the case where in the graft polymerization use is made of a monovinyl monomer containing ionic groups with weak-basic properties, for example pyridine groups, the product resulting from the graft polymerization is subjected to, for example alkylation, to convert said weak-basic ionic groups to strong-basic ones, e.g. pyridine groups to pyridinium groups.

When the method according to the present invention is conducted continuously, for the initiation of a radical graft polymerization use is made of the initiator system:

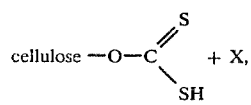

wherein X is $Fe^{3+}$ (cf. U.S. Pat. No.3,878,144 ). In this case, the graft polymerization and modification are effected in a single stage by way of continuously passing a freshly-formed viscose filament containing xanthate groups (degree of substitution is 0.05 to 0.2) through a bath containing ferric sulphate as well as an aqueous solution, aqueous suspension or an aqueous emulsion of a mixture of a monovinyl monomer and divinylbenzene. The filament coming out of the bath and comprising a graft copolymer of cellulose with the monovinyl monomer modified with divinylbenzene is subjected, when necessary, to an additional treatement (e.g. for the purpose of conversion of non-ionic groups to ionic ones or for the purpose of conversion of weak-basic ionic groups to strong-basic ones), washed, dried and wound onto a pick-up means or cut into staple fibers.

For a better understanding of the present invention, the following specific examples are given hereinbelow by way of illustration.

EXAMPLE 1

100 g of viscose staple are treated with an aqueous solution of $FeSO_4$ at a temperature within the range of from 22° to 25° C. for a period of 30 minutes. Concentration of $FeSO_4$ is equal to 0.5 g/l, treatment modulus (ratio of the cellulose mass to the liquid phase mass) is equal to 25; pH is maintained within the range of from 4.5 to 5.5. Then the fiber is washed with distilled water, squeezed and placed into an aqueous emulsion of a mixture of monomers consisting of 2-methyl-5-vinyl-pyridine and divinylbenzene. As the emulsifier use is made of a compound

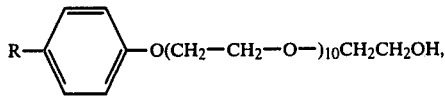

wherein R is an alkyl with 8 to 10 carbon atoms. The total concentration of the monomers in the emulsion is 7%, the amount of divinylbenzene is 1 mol.% of that of 2-methyl-5-vinylpyridine, the concentration of the emulsifier is equal to 0.2%. Into the reaction mixture there is added 0.01% of hydrogen peroxide and the reaction is conducted at a temperature of 80° C. for 120 minutes. The resulting modified fiber is washed with water and dried to a constant weight. The product weight is 200 g, weight increment is 100% (calculated for the starting mass of cellulose). The static exchange capacity as calculated for the aqueous solution of HCl (0.1 N) is equal to 2.58 mg-equiv/g. The degree of swelling in water at a temperature of 20° C. is 180%.

Under similar conditions there is prepared a graft copolymer of cellulose with 2-methyl-5-vinylpyridine without the use of divinylbenzene. The weight increment is 100%. The static exchange capacity as calculated for the 0.1 N aqueous solution of HCL is 2.84 mg-equiv/g. The degree of swelling in water at a temperature of 20° C. is 210%.

The resulting fibers are processed to a non-woven material. Wastes after the processing are the following: for the product containing divinylbenzene—10%, for the product containing no divinylbenzene—42%.

Tenacity of the non-woven material is equal to, in km. kgf/kg for the product containing divinylbenzene: along the length—0.663; along the width—0.099; for the product containing no divinylbenzene: along the length—0.270, along the width—0.031.

EXAMPLE 2

Graft copolymers of cellulose with 2-methyl-5-vinyl-pyridine containing divinylbenzene and therewithout are prepared in a manner similar to that described in the foregoing Example 1. The content of divinylbenzene in the mixture of monomers is 4 mol.% of the amount of 2-methyl-5-vinylpyridine.

To convert weak-basic pyridine groups to strong-basic pyridinium groups, both samples are treated with a 10% aqueoacetone solution of dimethylsulphate at a temperature within the range of from 20° to 25° C. for one hour, washed and dried.

In the treatment of the product containing divinylbenzene, the yield after alkylation is 99.5% of the theory. The static exchange capacity as calculated for the 0.1 N aqueous solution of HCl is equal to 3.2 mg-equiv/g. The degree of swelling in water at a temperature of 20° C. is equal to 180%. The ionite retains its fibrous structure. Upon the manufacture of a non-woven fabric therefrom, wastes after the textile processing are 12%.

In the treatment of the product containing no divinylbenzene, the yield after alkylation is equal to 76% of the theoretical value. Static exchange capacity for the 0.1 N aqueous solution of HCl is equal to 2.5 mg-equiv/g. The degree of swelling in water at temperature of 20° C. is 270%. Upon the manufacture of non-woven materials from this product, wastes after the textile processing are 56%.

Tenacity of the non-woven material is equal to, in km. kgf/kg: for the product containing divinylbenzene: along the length—0.449; along the width—0.056; for the product containing no divinylbenzene: along the length—0.171, along the width—0.042.

EXAMPLE 3

100 g of viscose staple are treated with an aqueous solution of Mohr's salt (ferrous ammonium sulphate) (0.5 g/l) at a temperature within the range of from 22° to 25° C. and a pH value of from 4.5 to 5.5 for 30 minutes. Then the fiber is washed with distilled water, squeezed and placed into an aqueous dispersion of a mixture of monomers: acrylonitrile and divinylbenzene. The total concentration of the monomers in the reaction medium is equal to 7%, the content of divinylbenzene is 3 mol.% of the amount of acrylonitrile. Into the reaction mixture there is added 0.01% of hydrogen peroxide and the reaction is conducted at temperature of 70° C. for period of 60 minutes. The resulting product is washed with water, acetone and dried. The yield is equal to 185 g, weight increment is 85%.

In order to convert non-ionic nitrile groups to ionic carboxyl groups, the product is subjected to hydrolysis by means of a 1% aqueous solution of caustic soda for 3 hours at temperature of 80° C. The static exchange capacity for a 1 N aqueous NaOH solution is equal to 4.4 mg-equiv/g. The degree of swelling in water at temperature of 20° C. is equal to 190%.

Under similar conditions a graft-copolymer of cellulose with acrylonitrile (without divinylbenzene) is prepared with a subsequent polymer-analogous conversion of nitrile groups to carboxyl ones. The amount of the graft polymer is 84.7% (by mass of cellulose). The static exchange capacity for a 0.1 N aqueous solution of NaOH is equal to 4.5 mg-equiv/g. The degree of swelling in water is 450%.

The product prepared with the use of divinylbenzene retains its fibrous structure. The amount of wastes in its textile processing is 8%.

The product prepared without divinylbenzene comprises brittle fibres unsuitable for further textile processing.

EXAMPLE 4

Graft copolymers of cellulose with acrylonitrile, both with divinylbenzene and therewithout, are prepared in a manner similar to that described in the foregoing Example 3, with the only exception that the radical polymerization is conducted for period of 90 minutes. The weight increment is 90.7 and 89.3% respectively.

To convert non-ionic nitrile groups to ionic carboxyl groups, both products are subjected to hydrolysis by way of treatment with a 10 M aqueous solution of an alkali at temperature of 120° C. with abruptly stopping the hydrolysis process. Characteristics of the resulting products are shown in the following Table.

Table

| Content of divinyl-benzene in the starting mixture of the monomers, mol. % of acrylonitrile | Characteristics of the samples | | | |
| --- | --- | --- | --- | --- |
| | Amount of the graft polymer (weight increment), % by mass of cellulose | Static exchange capacity for 0.1 N aqueous NaOH solution, mg-equiv/g | Degree of swelling in water at 20° C., % | Ability for textile processing |
| 0 | 89.3 | 5.0 | 240 | Wastes in textile processing are equal to 72% |
| 3 | 90.7 | 4.9 | 210 | Wastes in textile processing are equal to 6% |

EXAMPLE 5

100 g of viscose staple are treated with an aqueous solution of Mohr's salt (0.5 g/l) at a temperature of from 22° to 25° C. and a pH value of from 4.5 to 5.5 for 30 minutes. Then the fiber is washed with distilled water, squeezed and placed into an aqueous emulsion of a mixture of methylmethacrylate with divinylbenzene. The total concentration of the monomers in the reaction medium is 6%, the content of divinylbenzene is 2 mol. % by the amount of methylmethacrylate; concentration of the emulsifier is 0.2%. As the emulsifier use is made of a compound of the formula:

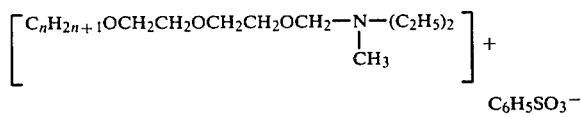

wherein n=14 to 17.

Into the reaction mixture there is added 0.01% of hydrogen peroxide and a reaction is conducted at the temperature of 65° C. for one hour (the treatment modulus is 50). The resulting product is washed with water and dried. The weight increment is 102%.

Under similar conditions a graft copolymer of cellulose with methylmethacrylate is prepared without divinylbenzene. The weight increment is 110%.

To produce cationites containing carboxyl groups, both types of the graft copolymers prepared as above are treated with a 0.5 N alcoholic solution of caustic potash at a temperature of 80° C. for 3 hours, washed with water and dried.

The content of carboxyl groups in the product modified with divinylbenzene is 16.8%. The static exchange capacity for a 0.1 N aqueous solution of NaOH is 3.7 mg-equiv/g. The degree of swelling in water at 20° C. is equal to 170%.

The content of carboxyl groups in the product prepared without divinylbenzene is 17.1%. The static exchange capacity for a 0.1 N aqueous solution of NaOH is equal to 3.8 mg-equiv/g. The degree of swelling in water at the temperature of 20° C. is 430%.

In the treatment of said products to non-woven materials the amount of wastes is the following:
for fibers containing divinylbenzene: 11%
for fibers containing no divinylbenzene: 43%.

EXAMPLE 6

100 g of viscose staple are treated with a 1% aqueous solution of $FeSO_4$ at a temperature of 20° C. for 20 minutes (the treatment modulus is 50), squeezed and placed for 30 minutes into a 2% aqueous solution of hydrogen peroxide (t=20° C.). Then the fiber is washed with water for 3 to 5 minutes at a temperature of 50° C. and placed into an aqueous solution of a mixture of monomers: acrylic acid - divinylbenzene containing also 0.25% of $FeSO_4$. The total concentration of the monomers in the solution is 15%, the content of divinylbenzene is 5 mol. % of the amount of acrylic acid. The reaction is conducted at 20° C. for 3 hours. The resulting modified product is washed with water and dried. The yield of the product is 205 g the weight increment is 105%. The content of carboxy groups is 21.8%. The static exchange capacity for a 0.1 N aqueous solution of NaOH is equal to 4.8 mg-equiv/g. The degree of swelling in water at a temperature of 20° C. is 170%. The product retains its fibrous structure; the amount of wastes in the textile processing is equal to 19%.

Under similar conditions there is prepared a graft copolymer of cellulose and acrylic acid (without divinylbenzene). The product yield is equal to 200 g, the weight increment is 100%. The content of carboxyl groups is 22.1%. The static exchange capacity of a 0.1 N aqueous solution of NaOH is 4.9 mg-equiv/g. The degree of swelling in water at a temperature of 20° C. is 530%. The product after drying loses its fibrous structure and becomes unsuitable for further textile processing.

EXAMPLE 7

100 g of viscose staple are treated with a 1% aqueous solution of $FeSO_4$ at a temperature of 20° C. over a period of 20 minutes (the treatment modulus is 50), squeezed and placed into a 2% aqueous solution of hydrogen peroxide (at a temperature of 20° C.) for 30 minutes. Then a fiber is washed for 3–5 minutes at the temperature of 50° C. and placed into an aqueous solution of a mixture of monomers, i.e. methacrylic acid - divinylbenzene containing also 0.25% of $FeSO_4$. The total concentration of the monomers in the solution is 12%, the content of divinylbenzene is 3 mol. % of the amount of methacrylic acid. The reaction is conducted at a temperature of 20° C. for a period of 3 hours. The resulting product is washed with water and dried. The yield of the product is 180 g, the weight increment is 80%. The static exchange capacity for a 0.1 N aqueous solution of NaOH is equal to 4.9 mg-equiv/g. The product retains its fibrous structure; the amount of wastes in the textile processing thereof is 22%.

Under similar conditions there is prepared a graft copolymer of cellulose with methacrylic acid but without divinylbenzene. The product yield is 178 g, the weight increment is 78%. The static exchange capacity as for a 0.1 N aqueous solution of NaOH is equal to 3.5 mg-equiv/g. The product after drying loses its fibrous structure, becomes brittle and unsuitable for further textile processing.

EXAMPLE 8

A graft copolymer of cellulose with acrylonitrile modified with divinylbenzene is prepared following the procedure similar to that described in Example 3 hereinbefore. The total concentration of the monomers in the reaction medium is 16%, the content of divinylbenzene is 3 mol.% of the amount of acrylonitrile. The weight increment is 130%.

Under similar conditions there is prepared a graft copolymer of cellulose and acrylonitrile without the use of divinylbenzene.

In order to convert non-ionic nitrile groups to ionic thioamide groups, both products are treated with a 6% aqueous solution of ammonium sulphide for a period of 3 hours at a temperature of 90° C.

The static exchange capacity for a 0.1 N aqueous solution of $AgNO_3$ is 6.9 mg-equiv/g for the product containing divinylbenzene. The degree of swelling in water at a temperature of 20° C. is 170%.

The static exchange capacity for a 0.1 N aqueous solution of $AgNO_3$ for the product containing no divinylbenzene is 7.1 mg-equiv/g. The degree of swelling in water at a temperature of 20° C. is equal to 240%.

In the processing into non-woven materials the amount of wastes is the following:
for the product containing divinylbenzene: 10.2%
for the product containing no divinylbenzene: 24%.

EXAMPLE 9

100 g of cotton are treated with a 0.2% aqueous solution of sodium hypochlorite at a temperature of 20° C. for one hour, washed with a 0.5% aqueous solution of acetic acid, and then with water to neutral reaction. Thereafter, the cellulose mass is treated following the procedure described in Example 1 hereinabove to give graft-copolymers of cellulose with 2-methyl-5-vinylpyridine both modified with divinylbenzene and containing no divinylbenzene.

The weight of the modified product is 190 g, the weight increment is equal to 90% (by mass of the starting cellulose).

The weight of the non-modified product is 185 g, the weight increment is 85%.

To convert weak-basic pyridine groups to strong-basic pyridinium groups, both samples are treated with a 10% aqueo-acetone solution of dimethylsulphate at a temperature of from 20° to 25° C. for a period of one hour and dried.

In the treatment of the product containing divinylbenzene the yield after alkylation is 99.6% of the theoretical value. The static exchange capacity as for a 0.1 N solution of HCl is equal to 2.8 mg-equiv/g. The degree of swelling in water at a temperature of 20° C. is 170%. After the treatment the product retains its fibrous structure and is suitable for further textile processing. The amount of wastes in the manufacture of non-woven materials is equal to 10%.

In the treatment of the product containing no divinylbenzene, the yield after alkylation is 85% of the theoretical value. The static exchange capacity for a 0.1 N aqueous solution of HCl is equal to 2 mg-equiv/g. The degree of swelling in water at the temperature of 20° C. is 320%. The amount of wastes in the manufacture of non-woven materials is 34%.

EXAMPLE 10

100 g of cellulose mass recovered from wood are treated with a 0.2% aqueous solution of sodium hypochlorite at a temperature of 20° C. for the period of one hour, washed with a 0.5% aqueous solution of acetic acid and then with water to a neutral reaction. Thereafter, the cellulose mass is treated following the procedure described in the foregoing Example 3 to give graft copolymers of cellulose with carboxy groups, modified with divinylbenzene, and non-modified graft copolymers of cellulose containing the same ionic groups.

The yield of the modified product containing carboxy groups is 95% of the theoretical value. The static exchange capacity of the product as for a 0.1 N aqueous solution of NaOH is equal to 4.3 mg-equiv/g. The degree of swelling in water at a temperature of 20° C. is 180%. The product comprises a loose fibrous mass containing no fibers adhered to one another.

The yield of the non-modified product containing carboxy groups is 75% of the theoretical value. The static exchange capacity as for a 0.1 N aqueous solution of NaOH is equal to 4.5 mg-equiv/g. The degree of swelling in water at a temperature of 20° C. is 370%. The product comprises a mass of fibers adhered to each other, whereby its use in ion-exchange processes is hindered.

EXAMPLE 11

Freshly-formed viscose fiber (thread or strand) with a degree of substitution of thiocarboxylic groups of from 0.1 to 0.15% is continuously passed through a bath with an aqueous solution of the following composition, mol/l: $Fe^{3+}$ 0.005, sulphuric acid 0.05, monovinyl monomer of the formula:

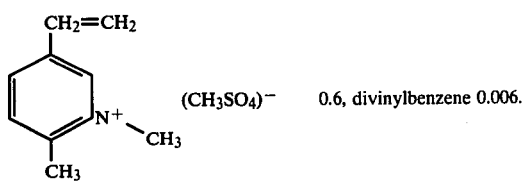

The bath temperature is 50° C. The time of treatment of the filament with said solution is 60 seconds. As a result, a strongly basic ionite is obtained comprising a graft copolymer of cellulose with the monovinyl/monomer modified with divinylbenzene. The filament coming out of the bath is squeezed, washed with water, wound onto a pick-up means and dried. The weight increment is 80% (by mass of the starting cellulose). The static exchange capacity as for a 0.1 N aqueous solution of HCl is equal to 2.6 mg-equiv/g. The degree of swelling in water at a temperature of 20° C. is 200%.

Under similar conditions a freshly-formed viscose filament is treated, with the only exception that divinylbenzene is not present in the composition of the bath solution. In this case the weight increment is equal to 75%. The static exchange capacity as for a 0.1 N aqueous solution of HCl is equal to 2.4 mg-equiv/g. The degree of swelling in water at a temperature of 20° C. is 350%.

What is claimed is:

1. A method for preparing fibrous modified graft copolymers of cellulose with monomers selected from the group consisting of monovinyl monomers containing ionic groups and monovinyl monomers containing non-ionic groups capable of being converted to ionic groups, comprising a free-radical graft-polymerization of said monovinyl monomers onto cellulose in the presence of a free-radical initiator, and modification of the resulting graft copolymers of cellulose with said monovinyl monomers; said method being conducted in the presence of divinylbenzene as the modifying agent in an amount ranging from 1 to 5 mol.% of the monovinyl monomer.

2. The method of claim 1, wherein the free radical polymerization and modification are performed in a single stage.

3. The method of claim 1, wherein the cellulose is selected from the group consisting of viscose staple, cotton, and wood pulp.

4. The method of claim 1, wherein the vinyl monomers are selected from the group consisting of acrylic acid, methacrylic acid, derivatives of methacrylic acid, derivatives of acrylic acid, and vinylpyridines.

5. Th method of claim 1, wherein the free radical initiator system is selected from the group consisting of $H_2O_2$ and $Fe^{+2}$, cellulose and

wherein R is hydrogen or alkyl, and cellulose and

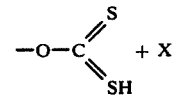

wherein X can be $H_2O_2$, $(NH_4)_2S_2O_8$, $Fe^{+3}$, $V^{+5}$, and $Cr^{+6}$.

6. The method of claim 1, wherein said method is conducted continuously or discontinuously.

7. The product formed by the method of claim 1.